United States Patent [19]
McNamara

[11] 3,739,562
[45] June 19, 1973

[54] GARDEN TOOL
[75] Inventor: Gerald J. McNamara, Birchrun, Mich.
[73] Assignee: The Raymond Lee Organization, Inc., New York, N.Y.
[22] Filed: Feb. 29, 1972
[21] Appl. No.: 230,339

[52] U.S. Cl................. 56/400.06, 172/378, 306/15
[51] Int. Cl.............................................. A01d 7/10
[58] Field of Search.................. 56/400.06, 400.05; 172/371, 372, 373, 378, 380, 375; 306/15, 16, 17

[56] References Cited
UNITED STATES PATENTS
| 236,711 | 1/1881 | Lines | 56/400.06 X |
| 2,058,225 | 10/1936 | Giradello | 56/400.06 X |
| 2,076,120 | 4/1937 | Cyganick | 56/400.06 X |
| 2,400,451 | 5/1946 | Wilson | 172/380 X |
| 351,296 | 10/1886 | Stinson et al. | 56/400.06 X |
| 2,253,116 | 8/1941 | Findlay | 172/13 |

Primary Examiner—Russell R. Kinsey
Attorney—Howard I. Podell

[57] ABSTRACT

An improved tool for use in landscaping work consisting of a handle attached to a tool by means of an angularly adjustable joint, said tool consisting of a set of rake teeth on one edge of the tool surface, and a hoe blade on the opposed edge of the tool surface. The adjustable joint permits the locking of the tool surface at any desired angle to the handle to permit use of either the rake or the hoe edges and at the angle required for the particular task. With the tool surface locked at right angles to the handle, the device may be employed as a tamping tool.

2 Claims, 6 Drawing Figures

PATENTED JUN 19 1973  3,739,562
FIG. 1
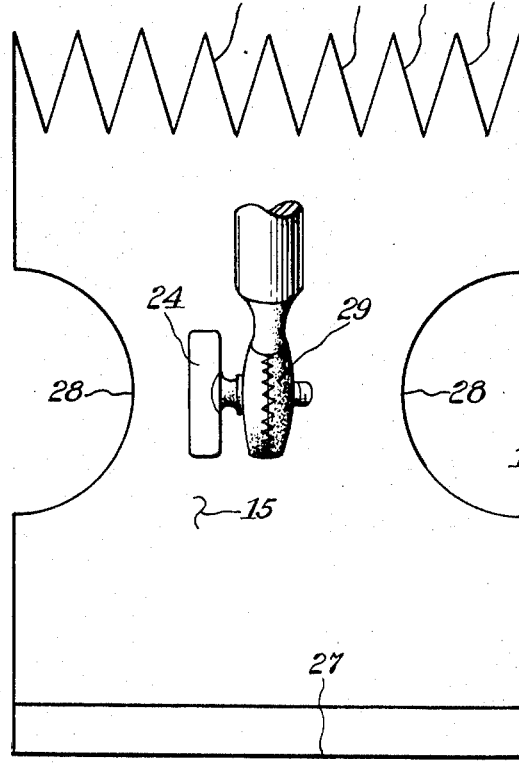
FIG. 2
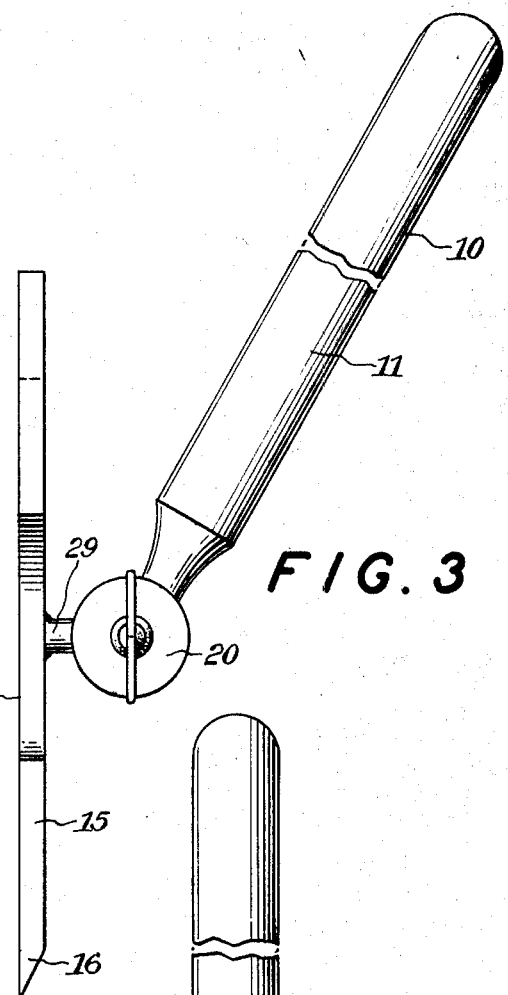
FIG. 3
FIG. 4
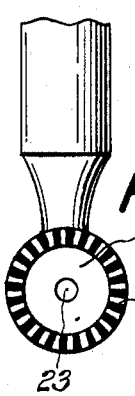
FIG. 5
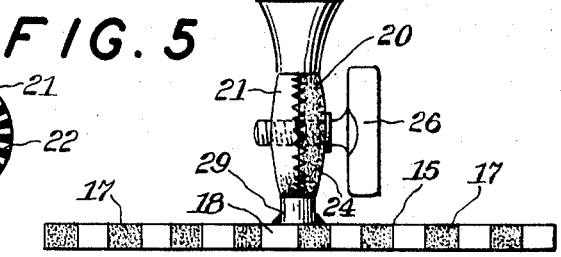
FIG. 6

GARDEN TOOL

SUMMARY OF THE INVENTION

This invention relates to an improved combination rake, and hoe, and tamping device in which the working surface of the tool may be adjusted and locked at a desired angle with respect to the tool handle.

An advantage of this invention is that soil may be more readily worked in spite of adjacent obstructions such as walls, walks, trees or boulders.

A further advantage of this invention is that the working surface of the tool may be altered from that of a rake to that of a hoe, or to that of a tamp at the job site.

An improvement in the design of the working surface utilized as a hoe, permits the use of this working surface for the additional purposes of loosening hard ground or for the chopping of ice.

The rotation of the working tool surface with respect to the handle, and the manner of fastening the handle to the central portion of the working surface, permits the tool to be used as a means of tamping soft ground, gravel or cinder as required.

The tool consists of a conventional handle which is fastened to the central area of the tool working surface by means of a rotatable joint, which joint may be locked in any desired angular relation between the tool surface and the handle, by means of a wing nut or thumb screw. The lock joint consists of mating serrated surfaces which are tightened together by the screw fastener, with one serrated surface integrally fastened to the handle, and the mating serrated surface integrally fastened to the tool working surface.

The tool working surface is in the form of a plane, with one edge shaped in the form of rake teeth, and the opposing edge formed with a straight cutting edge.

BRIEF DESCRIPTION OF THE DRAWING

The objects and features of the invention may be understood with reference to the following detailed description of an illustrative embodiment of the invention, taken together with the accompanying drawing in which:

FIG. 1 is a perspective view of a landscaper utilizing the tool as a hoe blade;

FIG. 2 is a plan view of the working tool surface;

FIG. 3 is a side view of the tool and handle;

FIG. 4 is a front view of the tool and handle;

FIG. 5 is a side view of the joint member fastened to the tool handle; and

FIG. 6 is a side view of the joint member fastened to the tool working surface.

DESCRIPTION OF THE PREFERRED EMBODIMENT

Turning now descriptively to the drawing, in which similar reference characters denote similar elements throughout the several views, FIG. 1 illustrates a landscaper 12 employing the tool 10 to trim the edges of lawn 13 close to walkway 14.

As shown in FIG. 2-6, the tool consists of handle 11 fastened by rotatable joint assembly 20 to flat tool member 15. Tool member 15 is of generally flat plate material with working edge 16 sharpened to a knife edge 27, and opposed working edge 18 formed with rake teeth 17. Both working edges 16 and 18 are perpendicular to the direction of rotation of tool member 15 about joint assembly 20.

The back surface 19 of the tool member 15 is flat, serving as a tamping surface when the plane of the tool member 15 is aligned at right angles to the handle member 11. Circular recesses 28 may be made in each side of the tool member to reduce the area of the back surface 19 so as to reduce the tamping force required, and to also reduce the weight of the device 10.

Rotatable joint assembly 20 consists of a serrated member 21 fastened to the handle member 11, with a serrated member 20 fastened to the tool member 15, both serrated members 21 and 22 having mating serrations located in a circular form in a plane radially located at right angles to the axis of fastener thumb screw 26. Screw 26 mates with female thread 23 in serrated joint member 21, and fits loosely in hole 25 of serrated joint member 24. Serrated joint member 24 is fastened by weldments 29 to tool member 15.

Loosening of thumb screw 26 permits the separation of the mating serrated joint members 21 and 24 so that tool member 15 may be rotated about the axis of joint 20 to set the tool member 15 at the most convenient angle for the purposes of the landscaper 12.

Since obvious changes may be made in the specific embodiment of the invention described herein, it is indicated that all matter contained herein is intended as illustrative and not as limiting in scope.

I claim:

1. An improved landscaping tool which serves the purpose of a rake, hoe, tamper and chopper comprising a flat plate member which is mounted about its center so as to be rotatable about the pivot of an adjustable lockable joint to which the tool handle is fastened, said tool handle being in the general form of a cylindrical shaft, said plate member having one working edge in the form of rake teeth and having an opposite working edge in the form of a straight knife edge, with the plate member being of general uniform thickness except for the beveled shape of the knife edge and except in the area of connection of the plate member to the mounting of the rotatable joint on the inner surface of the plate member, with the back surface of the plate member being uniformly flat for use in tamping the ground, with the shape of said plate member being generally rectangular except for a curved recesses in each of the two sides of the plate member that join the working edges, said curved recesses serving to reduce the area of the plate member and consequently the area of the back surface of the plate member utilized for tamping purposes, from the area that would otherwise be available in a similar plate member of otherwise rectangular proportions, said reduced area of the plate member permitting the user to apply a greater tamping pressure for a given application of tamping force applied to the tool handle.

2. The combination as recited in claim 1 in which the boundaries of each recess in each side of the plate member forms a circular arc of uniform radius.

* * * * *